(12) United States Patent
Kubota

(10) Patent No.: US 9,029,021 B2
(45) Date of Patent: May 12, 2015

(54) BATTERY, METHOD OF CHARGING AND DISCHARGING THE BATTERY AND CHARGE-DISCHARGE CONTROL DEVICE FOR THE BATTERY

(75) Inventor: Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/762,080

(22) Filed: Apr. 16, 2010

(65) Prior Publication Data

US 2010/0194347 A1 Aug. 5, 2010

Related U.S. Application Data

(62) Division of application No. 11/037,840, filed on Jan. 18, 2005, now abandoned.

(30) Foreign Application Priority Data

Jan. 20, 2004 (JP) .................................. 2004-012352
Nov. 30, 2004 (JP) .................................. 2004-347294

(51) Int. Cl.
*H01M 10/0567* (2010.01)
*H01M 4/58* (2010.01)
*H01M 4/66* (2006.01)
*H01M 10/44* (2006.01)
*H01M 10/052* (2010.01)
*H01M 4/134* (2010.01)
*H01M 4/1395* (2010.01)
*H01M 4/38* (2006.01)
*H01M 4/04* (2006.01)
(Continued)

(52) U.S. Cl.
CPC .......... *H01M 10/052* (2013.01); *H01M 4/0404* (2013.01); *H01M 4/0471* (2013.01); *H01M 4/134* (2013.01); *H01M 4/1395* (2013.01); *H01M 4/38* (2013.01); *H01M 4/661* (2013.01); *H01M 10/0569* (2013.01); *H01M 10/44* (2013.01); *H01M 2004/021* (2013.01); *H01M 2010/4292* (2013.01); *Y02E 60/122* (2013.01)

(58) Field of Classification Search
USPC ............... 429/231.95, 245, 200, 331, 332, 50
See application file for complete search history.

(56) References Cited

U.S. PATENT DOCUMENTS

| 6,083,644 A | 7/2000 | Watanabe et al. |
| 6,163,131 A * | 12/2000 | Gartstein et al. ............... 320/118 |

(Continued)

FOREIGN PATENT DOCUMENTS

| CN | 1333579 | 1/2002 |
| CN | 1610171 | 4/2005 |

(Continued)

OTHER PUBLICATIONS

Japanese Office Action dated Aug. 1, 2008 for Application No. 2004-347294.

(Continued)

*Primary Examiner* — Karie O'Neill Apicella
(74) *Attorney, Agent, or Firm* — Dentons US LLP

(57) ABSTRACT

A method of charging and discharging a battery that includes an anode. The anode includes silicon and is capable of inserting and extracting lithium. At the time of charge, the potential of the anode vs. lithium metal as a reference potential is 0.04 V or more. At the time of discharge, the potential of the anode vs. lithium metal as a reference potential is 1.4 V or less.

8 Claims, 4 Drawing Sheets

(51) Int. Cl.
    *H01M 10/0569* (2010.01)
    *H01M 4/02* (2006.01)
    *H01M 10/42* (2006.01)

(56) References Cited

U.S. PATENT DOCUMENTS

| | | | |
|---|---|---|---|
| 6,235,427 | B1 | 5/2001 | Matsufuji |
| 6,346,343 | B1 * | 2/2002 | Notten et al. .................. 429/60 |
| 6,413,672 | B1 | 7/2002 | Suzuki et al. |
| 6,428,933 | B1 * | 8/2002 | Christensen et al. .... 429/231.95 |
| 2001/0053485 | A1 | 12/2001 | Shibuya et al. |
| 2004/0043294 | A1 | 3/2004 | Fukui et al. |
| 2004/0043300 | A1 * | 3/2004 | Utsugi et al. ................. 429/329 |
| 2005/0095503 | A1 * | 5/2005 | Adachi et al. ................. 429/188 |

FOREIGN PATENT DOCUMENTS

| | | |
|---|---|---|
| EP | 0845828 | 6/1998 |
| JP | 08-115742 | 5/1996 |
| JP | 10-189043 | 7/1998 |
| JP | HEI 10-255768 | 9/1998 |
| JP | 11-233155 | 8/1999 |
| JP | 2000-003727 | 1/2000 |
| JP | 2000-003731 | 1/2000 |
| JP | 2000-012088 | 1/2000 |
| JP | 2002-352797 | 1/2000 |
| JP | 2000-036323 | 2/2000 |
| JP | 2000-188126 | 7/2000 |
| JP | 2000-215887 | 8/2000 |
| JP | 2002-083594 | 3/2002 |
| JP | 2002-260637 | 9/2002 |
| JP | 2003-007342 | 1/2003 |
| JP | 2003-168479 | 6/2003 |
| JP | 2003-168480 | 6/2003 |
| JP | 2003-208893 | 7/2003 |
| JP | 2003-338317 | 11/2003 |
| JP | 2005-063772 | 3/2005 |
| JP | 2005-235734 | 9/2005 |

OTHER PUBLICATIONS

Japanese Office Action dated May 22, 2013 for Japanese Application No. 2010-225029.
Chinese Office Action issued in connection with related Chinese Patent Application No. CN201210227932.0 dated Jan. 2, 2014.
Japanese Office Examination Report issued in connection with related Japanese patent application No. JP 2014-018481 dated Dec. 18, 2014.

* cited by examiner

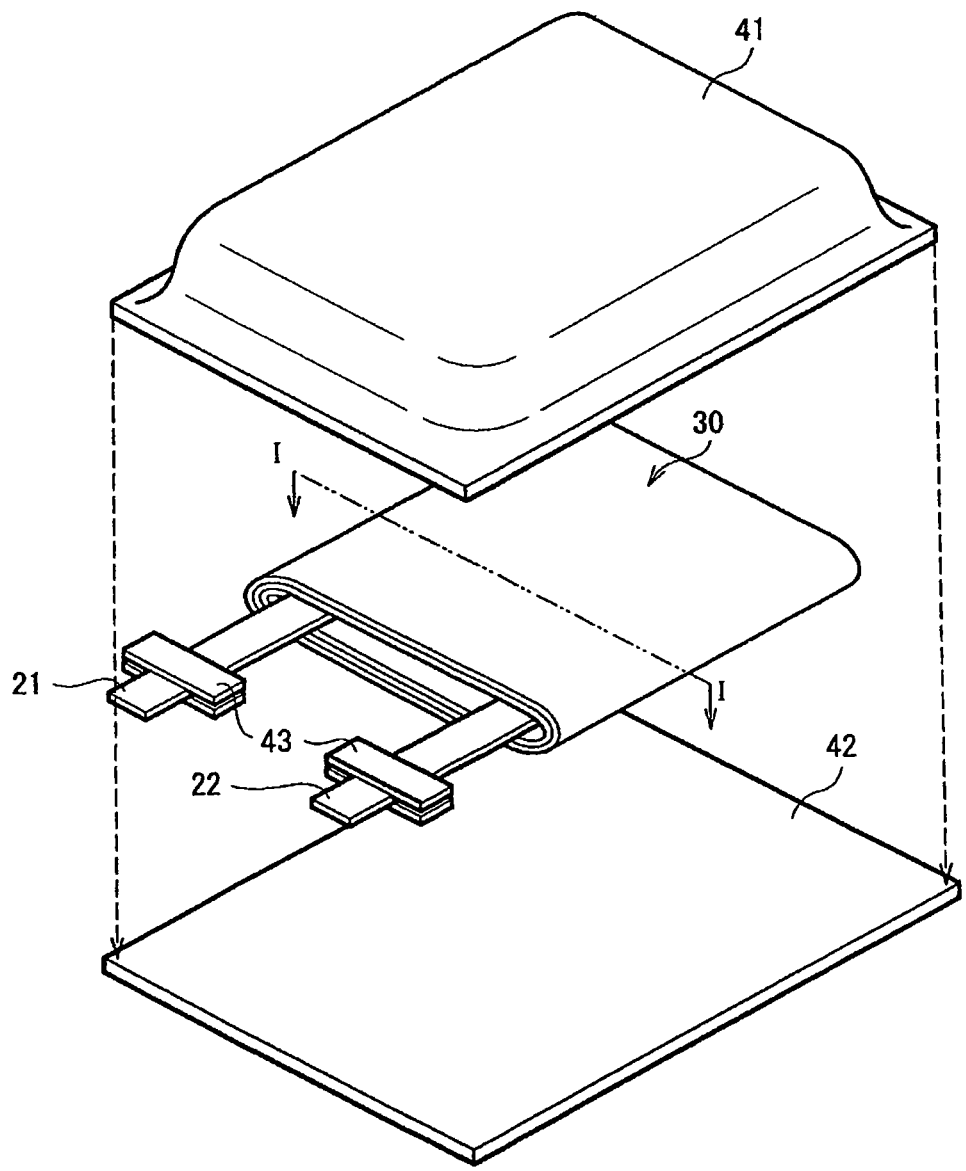
F I G. 2

BATTERY, METHOD OF CHARGING AND DISCHARGING THE BATTERY AND CHARGE-DISCHARGE CONTROL DEVICE FOR THE BATTERY

CROSS-REFERENCE TO RELATED APPLICATIONS

This application is a division of U.S. application Ser. No. 11/037,840, entitled "BATTERY, METHOD OF CHARGING AND DISCHARGING THE BATTERY AND CHARGE-DISCHARGE CONTROL DEVICE FOR THE BATTERY," filed on Jan. 18, 2005, the entirety of which is incorporated herein by reference to the extent permitted by law. The present invention claims priority to Japanese Patent Application Nos. P2004-012352, filed Jan. 20, 2004, and P2004-347294 filed Nov. 30, 2004, the entirety of which is also incorporated herein by reference to the extent permitted by law.

BACKGROUND OF THE INVENTION

The present invention relates to a battery comprising an anode which includes silicon (Si) as an element and is capable of inserting and extracting lithium (Li), a method of charging and discharging the battery, and a charge-discharge control device for the battery.

DESCRIPTION OF THE RELATED ART

In recent years, as mobile devices have become more sophisticated and multifunctional, a demand for higher capacity of secondary batteries as power sources for the mobile devices has been made. As a secondary battery which meets the demand, a lithium secondary battery is cited. However, in a currently typical lithium secondary battery which uses lithium cobalt oxide for a cathode and graphite for an anode, its battery capacity has reached the saturation point, so it is extremely difficult to significantly increase its capacity. Therefore, using lithium metal for an anode has been considered since a long time ago; however, in order to put the anode to practical use, it is required to improve lithium precipitation/dissolution efficiency and control dendritic deposition.

On the other hand, in recent times, a study of an anode with a high capacity which uses silicon, germanium (Ge), tin (Sn) or the like has been conducted vigorously. However, when charge and discharge are repeated, the anode with a high capacity is broken into small pieces due to severe expansion and shrinkage of an active material, thereby a current collecting property declines, and the decomposition of an electrolyte solution is accelerated due to an increase in a surface area, so cycle characteristics are extremely poor. Therefore, an anode formed through forming an active material layer on a current collector by a vapor-phase deposition method, a liquid-phase deposition method, a sintering method or the like has been studied (refer to Japanese Unexamined Patent Application Publication No. Hei 8-50922, Japanese Patent No. 2948205, Japanese Unexamined Patent Application Publication Nos. Hei 11-135115, 2001-160392 and 2002-83594). The anode can be prevented from being broken into small pieces, compared to a conventional coating type anode formed through applying slurry including a particulate active material, a binder and the like, and the current collector and the active material layer can be formed as one unit. Therefore, the electronic conductivity in the anode is extremely superior, and higher performance in terms of capacity and cycle lifespan is expected. Moreover, an electrical conductor, a binder and voids which are present in a conventional anode can be reduced or eliminated, so the anode can be formed into a thin film in essence.

However, even in the anode, cycle characteristics are not sufficient, because the active material falls off due to expansion and shrinkage of the active material according to charge and discharge. Moreover, reactivity with an electrolyte is still high, so a reaction of the anode with the electrolyte according to charge and discharge causes a decline in the capacity of the battery.

SUMMARY OF THE INVENTION

In view of the foregoing, it is an object of the invention to provide a battery capable of improving cycle characteristics through reducing a structural fracture of an anode according to charge and discharge and reactivity with an electrolyte, a method of charging and discharging the battery, and a charge-discharge control device for the battery.

A first battery according to the invention comprises: an anode including silicon as an element and being capable of inserting and extracting lithium; a cathode being capable of inserting and extracting lithium; and an electrolyte, wherein a molar ratio of lithium atoms to silicon atoms (Li/Si) in the anode is 4.0 or less.

A second battery according to the invention comprises: an anode including silicon as an element and being capable of inserting and extracting lithium; a cathode being capable of inserting and extracting lithium; and an electrolyte, wherein a potential of the anode vs. lithium metal as a reference potential is 0.04 V or more.

In a first method of charging and discharging a battery, the battery comprising an anode which includes silicon as an element and is capable of inserting and extracting lithium is charged and discharged, and at the time of charge, a molar ratio of lithium atoms to silicon atoms (Li/Si) in the anode is 4.0 or less.

In a second method of charging and discharging a battery, the battery comprising an anode which includes silicon as an element and is capable of inserting and extracting lithium is charged and discharged, and a potential of the anode vs. lithium metal as a reference potential at the time of charge is 0.04 V or more.

In a first charge-discharge control device for a battery, charge and discharge of the battery comprising an anode which includes silicon as an element and is capable of inserting and extracting lithium is controlled, and the charge-discharge control device comprises a charge control portion for controlling a molar ratio of lithium atoms to silicon atoms (Li/Si) in the anode at the time of charge to 4.0 or less.

In a second charge-discharge control device for a battery, charge and discharge of the battery comprising an anode which includes silicon as an element and is capable of inserting and extracting lithium is controlled, and the charge-discharge control device comprises a charge control portion for controlling a potential of the anode vs. lithium metal as a reference potential at the time of charge to 0.04 V or more.

In the first battery, the first method of charging and discharging a battery, and the first charge-discharge control device according to the invention, the molar ratio of lithium atoms to silicon atoms (Li/Si) in the anode is 4.0 or less, or in the second battery, the second method of charging and discharging a battery, and the second charge-discharge control device according to the invention, the potential of the anode vs. lithium metal as a reference potential is 0.04 V or more, so an overreaction between the anode and the electrolyte and a structural fracture of the anode due to expansion and shrinkage of the anode can be prevented. Therefore, cycle characteristics can be improved.

In particular, when the molar ratio of lithium atoms to silicon atoms (Li/Si) in the anode is 0.4 or more, or when the potential of the anode vs. lithium metal as a reference potential is 1.4 V or less, the cycle characteristics can be further improved.

Moreover, when the electrolyte include at least one kind selected from the group consisting of a cyclic carbonate having an unsaturated bond and a carbonate derivative containing a halogen atom, the cycle characteristics can be further improved, and storage characteristics and the like can be improved.

Other and further objects, features and advantages of the invention will appear more fully from the following description.

BRIEF DESCRIPTION OF THE DRAWINGS

FIG. 2 is an exploded perspective view of another secondary battery according to the embodiment of the invention.

DETAILED DESCRIPTION OF THE PREFERRED EMBODIMENTS

A preferred embodiment of the present invention will be described in more detail below referring to the accompanying drawings.

Figure 1:
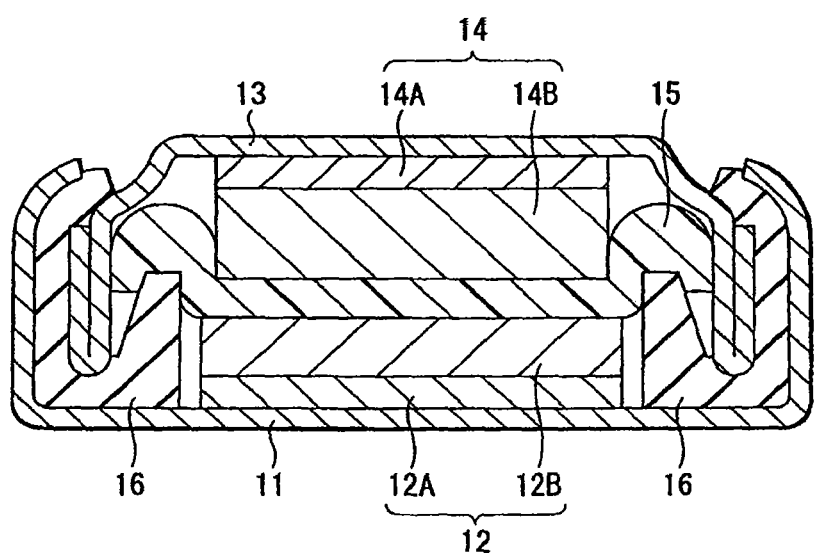
FIG. 1 is a sectional view of a secondary battery according to an embodiment of the invention.

FIG. 1 shows a sectional view of a secondary battery according to an embodiment of the invention. The secondary battery is a so-called coin type, and in the secondary battery, a cathode 12 contained in a package can 11 and an anode 14 contained in a package cup 13 are laminated with a separator 15 in between. The edge portions of the package can 11 and the package cup 13 are caulked by an insulating gasket 16 to seal the cathode 12 and the anode 14. The package can 11 and the package cup 13 are made of, for example, metal such as stainless or aluminum (Al).

The cathode 12 includes, for example, a cathode current collector 12A and a cathode active material layer 12B disposed on the cathode current collector 12A. The cathode current collector 12A is made of, for example, aluminum, nickel (Ni), stainless or the like.

The cathode active material layer 12B includes, for example, one kind or two or more kinds selected from cathode materials capable of inserting and extracting lithium as a cathode active material, and may include an electrical conductor such as a carbon material and a binder such as polyvinylidene fluoride, if necessary. As the cathode material capable of inserting and extracting lithium, for example, a lithium-containing metal complex oxide represented by a general formula $Li_xMIO_2$ is preferable, because as the lithium-containing metal complex oxide can generate a high voltage and has a high density, a higher capacity of the secondary battery can be achieved by the lithium-containing metal complex oxide. In the formula, MI represents one or more kinds of transition metals, and for example, at least one kind selected from the group consisting of cobalt (Co) and nickel is preferable as MI. The value of x depends upon a charge-discharge state of the battery, and is generally within a range of $0.05 \leq x \leq 1.10$. Specific examples of such a lithium-containing metal complex oxide include $LiCoO_2$, $LiNiO_2$ and the like.

The anode 14 includes, for example, an anode current collector 14A and an anode active material layer 14B disposed on the anode current collector 14A. The anode current collector 14A is preferably made of a metal material including at least one kind selected from metal elements which do not form an intermetallic compound with lithium. It is because when the metal material forms an intermetallic compound with lithium, the anode current collector 14A expands and shrinks according to charge and discharge, thereby its structural fracture occurs, so a current collecting property declines, and an ability of the anode current collector 14A to support the anode active material layer 14B is reduced, thereby the anode active material layer 14B easily falls off the anode current collector 14A. In the description, the metal material includes not only simple substances of metal elements but also an alloy including two or more kinds of metal elements and an alloy including one or more kinds of metal elements and one or more kinds of metalloid elements. Examples of the metal element which does not form an intermetallic compound with lithium include copper (Cu), nickel, titanium (Ti), iron (Fe) and chromium (Cr).

Moreover, the anode current collector 14A preferably includes a metal element which is alloyed with the anode active material layer 14B. As will be described later, in the case where the anode active material layer 14B includes silicon as an element, the anode active material layer 14B largely expands and shrinks according to charge and discharge, thereby the anode active material layer 14B easily falls off the anode current collector 14A; however, when the anode active material layer 14B is alloyed with the anode current collector 14A to firmly bond them together, the anode active material layer 14B can be prevented from falling off the anode current collector 14A. As a metal element which does not form an intermetallic compound with lithium and is alloyed with the anode active material layer 14B, for example, as a metal element alloyed with silicon, copper, nickel and iron are cited. In terms of strength and conductivity, they are preferable.

The anode current collector 14A may have a single layer or a plurality of layers. In the case where the anode current collector 14A has a plurality of layers, a layer making contact with the anode active material layer 14B may be made of a metal material being alloyed with the anode active material layer 14B, and other layers may be made of any other metal material. Moreover, the anode current collector 14A is preferably made of a metal material including at least one kind selected from metal elements which do not form an intermetallic compound with lithium, except for an interface with anode active material layer 14B.

As an anode active material, the anode active material layer 14B includes, for example, one kind or two or more kinds selected from anode materials which are capable of inserting and extracting lithium and include silicon as an element, because silicon has a large ability to insert and extract lithium and can obtain a high energy density. Silicon may be included in the form of a simple substance, an alloy or a compound. The silicon content in the anode active material layer 14B is preferably 50 mol % or more, more preferably 75 mol % or more, and more preferably 90 mol % or more, because the capacity can be increased.

Examples of the alloy or the compound of silicon include an alloy or a compound including boron (B), magnesium (Mg), aluminum, phosphorus (P), calcium (Ca), titanium, vanadium (V), chromium, manganese (Mn), iron, cobalt, nickel, copper, zinc (Zn), germanium (Ge), zirconium (Zr), niobium (Nb), molybdenum (Mo), palladium (Pd), silver (Ag), tin (Sn), antimony (Sb), tantalum (Ta), tungsten (W), barium (Ba) or the like in addition to silicon.

More specifically, $SiB_4$, $SiB_6$, $Mg_2Si$, $Ni_2Si$, $NiSi_2$, $TiSi_2$, $MoSi_2$, $CoSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, SiW, $Si_4W$, $Si_{0.95}W_{0.05}$, $Si_4Cu$, $Si_{0.95}Mo_{0.05}$, $Si_{0.99}B_{0.01}$, $Si_{0.995}P_{0.005}$, $Si_{0.9}Zn_{0.1}$ and the like are cited. They are indicated by a molar ratio.

The anode active material layer 14B is preferably formed by at least one kind selected from the group consisting of a vapor-phase deposition method, a liquid-phase deposition method and a sintering method, because a fracture of the anode active material layer 14B due to expansion and shrinkage thereof according to charge and discharge can be prevented, and the anode current collector 14A and the anode active material layer 14B can be formed as one unit, and the electronic conductivity in the anode active material layer 14B can be improved. Moreover, it is because a binder and voids can be reduced or eliminated, and the anode 14 can be formed into a thin film. In the description, "an active material layer is formed by a sintering method" means that a layer formed through mixing powder including an active material and a binder is heated in a nonoxidizing atmosphere or the like to form a denser layer with a higher volume density, compared to the layer before the heat treatment.

The anode active material layer 14B may be formed through coating, and more specifically, the anode active material layer 14B may include an anode active material and, if necessary, a binder such as polyvinylidene fluoride. However, the anode active material layer 14B formed by at least one kind selected from the group consisting of a vapor-phase deposition method, a liquid-phase deposition method and a sintering method is more preferable.

The anode active material layer 14B is preferably alloyed with the anode current collector 14A at least a part of an interface with the anode current collector 14A so that the anode active material layer 14B can be prevented from falling off the anode current collector 14A due to expansion and shrinkage. More specifically, it is preferable that an element of the anode current collector 14A is diffused into the anode active material layer 14B, or an element of the anode active material layer 14B is diffused into the anode current collector 14A, or they are diffused into each other at an interface therebetween. When the anode active material layer 14B is formed by a vapor-phase deposition method, a liquid-phase deposition method or a sintering method, alloying often occurs at the same time; however, alloying may occur by further heat treatment. In the description, the above-described diffusion of the elements is considered as a mode of alloying.

Moreover, in the secondary battery, for example, the ratio between the amount of the cathode active material and the amount of the anode active material is adjusted so as to control the amount of lithium to be inserted into the anode 14 during charge. More specifically, the ratio between the amount of the cathode active material and the amount of the anode active material is adjusted so that a molar ratio of lithium atoms to silicon atoms (hereinafter referred to as Li/Si ratio) in the anode 14 becomes 4.0 or less at the end of charge, or the potential of the anode 14 vs. lithium metal as a reference potential (hereinafter referred to as potential vs. Li) becomes 0.04 V or more at the end of charge. It is because when the amount of lithium to be inserted into the anode 14 is limited, an overreaction between the anode 14 and an electrolyte solution and the structural fracture of the anode 14 due to expansion and shrinkage can be prevented. The potential of the anode 14 vs. Li means a potential measured through taking the anode 14 out of the secondary battery, and then using the anode 14 as a working electrode and a lithium metal plate as a counter electrode.

The Li/Si ratio in the anode 14 at the end of charge is preferably adjusted to be 3.7 or less, and more preferably 3.5 or less. Moreover, the potential of the anode 14 vs. Li at the end of charge is more preferably adjusted to be 0.08 V or more, and more preferably 0.1 V or more. It is because cycle characteristics can be further improved. However, the smaller the Li/Si ratio is, or the larger the potential vs. Li is, the more the battery capacity will decline, so the Li/Si ratio at the end of charge is preferably adjusted to be at least 3.5 or more, or the potential vs. Li at the end of charge is preferably adjusted to be at least 0.1 V or less.

The Li/Si ratio in the anode 14 or the potential of the anode 14 vs. Li can be measured through taking the anode 14 out of the secondary battery, and then analyzing the anode active material layer 14B by an ICP (Inductively Coupled Plasma) method or measuring the capacity or the potential of the anode 14 by using the anode 14 as a working electrode and a lithium metal plate as a counter electrode.

The amount of lithium to be inserted into the anode 14 at the time of charge can be reduced, when the molar ratio of the cathode active material to the anode active material (the cathode active material/the anode active material) is reduced. A preferable molar ratio of the cathode active material to the anode active material depends upon kinds of the anode active material and cathode active material, or the like.

Moreover, in the secondary battery, for example, it is preferable that lithium is inserted into the anode 14 in advance to control the amount of lithium remaining in the anode 14 at the time of discharge. More specifically, the Li/Si ratio in the anode 14 at the end of discharge is preferably adjusted to be 0.4 or more, or the potential of the anode 14 vs. Li at the end of discharge is preferably adjusted to be 1.4 V or less. It is because when lithium remains in the anode 14, the expansion and shrinkage of the anode 14 can be reduced and the structural fracture can be prevented.

The Li/Si ratio in the anode 14 at the end of discharge is more preferably adjusted to be 0.43 or more, and more preferably 0.46 or more. Moreover, the potential of the anode 14 vs. Li at the end of discharge is preferably adjusted to be 1.2 V or less, and more preferably 1.1 V or less. It is because the cycle characteristics can be further improved. However, the more the Li/Si ratio increases, or the more the potential vs. Li is reduced, the more the battery capacity will decline, so it is preferable that at the end of discharge, the Li/Si ratio is adjusted to be at least 0.46 or less, and the potential vs. Li is adjusted to be at least 1.1 or more.

The separator 15 isolates the cathode 12 from the anode 14 to pass lithium ions therethrough while preventing a short circuit of current due to contact between the cathode 12 and the anode 14. The separator 15 is made of, for example, polyethylene or polypropylene.

The separator 15 is impregnated with an electrolyte solution which is a liquid electrolyte. The electrolyte solution includes, for example, a solvent and a lithium salt as an electrolyte salt dissolved in the solvent, and may include various additives if necessary. As the solvent, a nonaqueous solvent is preferable, and, for example, an organic solvent typified by a carbonate such as ethylene carbonate, propylene carbonate, dimethyl carbonate, diethyl carbonate or ethyl methyl carbonate is cited. One kind or a mixture of two or more kinds selected from them may be used. For example, a mixture including a high-boiling point solvent such as ethylene carbonate or propylene carbonate and a low-boiling point solvent such as dimethyl carbonate, diethyl carbonate or ethyl methyl carbonate is preferably used, because high ionic conductivity can be obtained.

As the solvent, a carbonate derivative containing a halogen atom is also cited, and the carbonate derivative containing a halogen atom is preferably used, because higher cycle characteristics can be obtained, and storage characteristics can be improved. In this case, the carbonate derivative containing a halogen atom may be used singly or in combination with any other solvent such as the above-described solvent. As the carbonate derivative containing a halogen atom, 4-fluoro-1,3-dioxolane-2-one, 4-chloro-1,3-dioxolane-2-one, 4-bromo-1,3-dioxolane-2-one, 4,5-difluoro-1,3-dioxolane-2-one and the like are cited, and among them, 4-fluoro-1,3-dioxolane-2-one is preferable, because a higher effect can be obtained.

As the solvent, a cyclic carbonate having an unsaturated bond is also cited, and the cyclic carbonate is preferably used in combination with any other solvent, because higher cycle characteristics can be obtained. As the cyclic carbonate having an unsaturated bond, 1,3-dioxol-2-one or 4-vinyl-1,3-dioxolane-2-one or the like is cited.

As the lithium salt, for example, $LiPF_6$, $LiClO_4$, $LiCF_3SO_3$, $Li(CF_3SO_2)_2N$, $Li(C_2F_5SO_2)_2N$, lithium bis(oxalato) borate shown in Chemical Formula 1 or lithium difluoro[oxalato-O,O']borate shown in Chemical Formula 2 is cited, and one kind or a mixture of two or more kinds selected from them may be used.

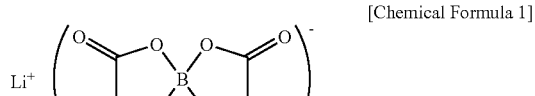

[Chemical Formula 1]

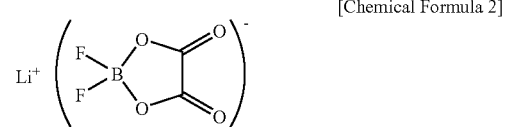

[Chemical Formula 2]

The battery can be manufactured through the following steps, for example.

At first, for example, a cathode active material, an electrical conductor and a binder are mixed to prepare a mixture, and then the mixture is dispersed in a dispersion medium such as N-methyl-2-pyrrolidone to form mixture slurry. Then, after the mixture slurry is applied to the cathode current collector 12A, the mixture slurry is compression molded to form the cathode active material layer 12B, thereby the cathode 12 is formed.

Next, for example, the anode active material is deposited on the anode current collector 14A by a vapor-phase deposition method or a liquid-phase deposition method to form the anode active material layer 14B, thereby the anode 14 is formed. Alternatively, the anode active material layer 14B may be formed by a sintering method in which after a precursor layer including a particulate anode active material is formed on the anode current collector 14A, the precursor layer is sintered, or the anode active material layer 14B may be formed by a combination of two or three methods selected from the group consisting of a vapor deposition method, a liquid-phase deposition method and a sintering method. Further, the anode active material layer 14B may be formed through mixing a particulate anode active material, an electrical conductor and a binder to form a mixture, dispersing the mixture in a dispersion medium such as N-methyl-2-pyrrolidone to form mixture slurry, applying the mixture slurry to the anode current collector 14A, and compression molding the mixture slurry. Through the use of at least one method selected from the group consisting of a vapor-phase deposition method, a liquid-phase deposition method and a sintering method, in some cases, the anode active material layer 14B alloyed with the anode current collector 14A at least a part of an interface with the anode current collector 14A is formed. In order to further alloy between the anode current collector 14A and the anode active material layer 14B at the interface, a heat treatment in a vacuum atmosphere or a nonoxidizing atmosphere may be further performed.

As the vapor-deposition method, for example, a physical deposition method or a chemical deposition method are used, and more specifically, a vacuum deposition method, a sputtering method, an ion plating method, a laser ablation method, a CVD (Chemical Vapor Deposition) method, a spraying method or the like can be used. As the liquid-phase deposition method, a known method such as an electrolytic plating method or an electroless plating method can be used. As the sintering method, a known technique such as, for example, an atmosphere sintering method, a reaction sintering method or a hot press sintering method can be used.

When the cathode 12 and the anode 14 are formed, the amount of the cathode active material and the amount of the anode active material are adjusted so that, as described above, the Li/Si ratio in the anode 14 at the time of charge becomes 4.0 or less or the potential of the anode 14 vs. Li at the time of charge becomes 0.04 V or more. Moreover, it is preferable that lithium is inserted into the anode 14, and, as described above, the Li/Si ratio in the anode 14 at the time of discharge becomes 0.4 or more, or the potential of the anode 14 vs. Li at the time of discharge becomes 1.4 V or less.

Next, for example, the cathode 12, the separator 15 impregnated with the electrolyte solution, and the anode 14 are laminated and put into the package can 11 and the package cup 13, and they are caulked. Thereby, the secondary battery shown in FIG. 1 can be obtained.

FIG. 2 shows another secondary battery according to the embodiment of the invention. The secondary battery is a so-called winding type, and in the secondary battery, a spirally wound electrode body 30 to which leads 21 and 22 are attached is contained in film-shaped package members 41 and 42, thereby the secondary battery can be formed with a smaller size, a lighter weight and a lower profile.

The leads 21 and 22 are drawn from the interiors of the package members 41 and 42 to outside, for example, in the same direction. The leads 21 and 22 are made of, for example, a metal material such as aluminum, copper, nickel or stainless in a sheet shape or a mesh shape.

The package members 41 and 42 are made of, for example, a rectangular aluminum laminate film including a nylon film, aluminum foil and a polyethylene film which are bonded in this order. The package members 41 and 42 are disposed so that the polyethylene film of each of the package members 41 and 42 faces the spirally wound electrode body 30, and edge portions of the package members 41 and 42 are adhered to each other by fusion bonding or an adhesive. An adhesive film 43 is inserted each between the package member 41 and the lead 21, between the package member 41 and the lead 22, between the package member 42 and the lead 21 and between the package member 42 and the lead 22 for preventing the entry of outside air. The adhesive film 43 is made of, for example, a material having adhesion to the leads 21 and 22, that is, a polyolefin resin such as polyethylene, polypropylene, modified polyethylene or modified polypropylene.

In addition, the package members 41 and 42 may be made of a laminate film with any other structure, a polymeric film such as polypropylene or a metal film instead of the aluminum laminate film.

Figure 3:
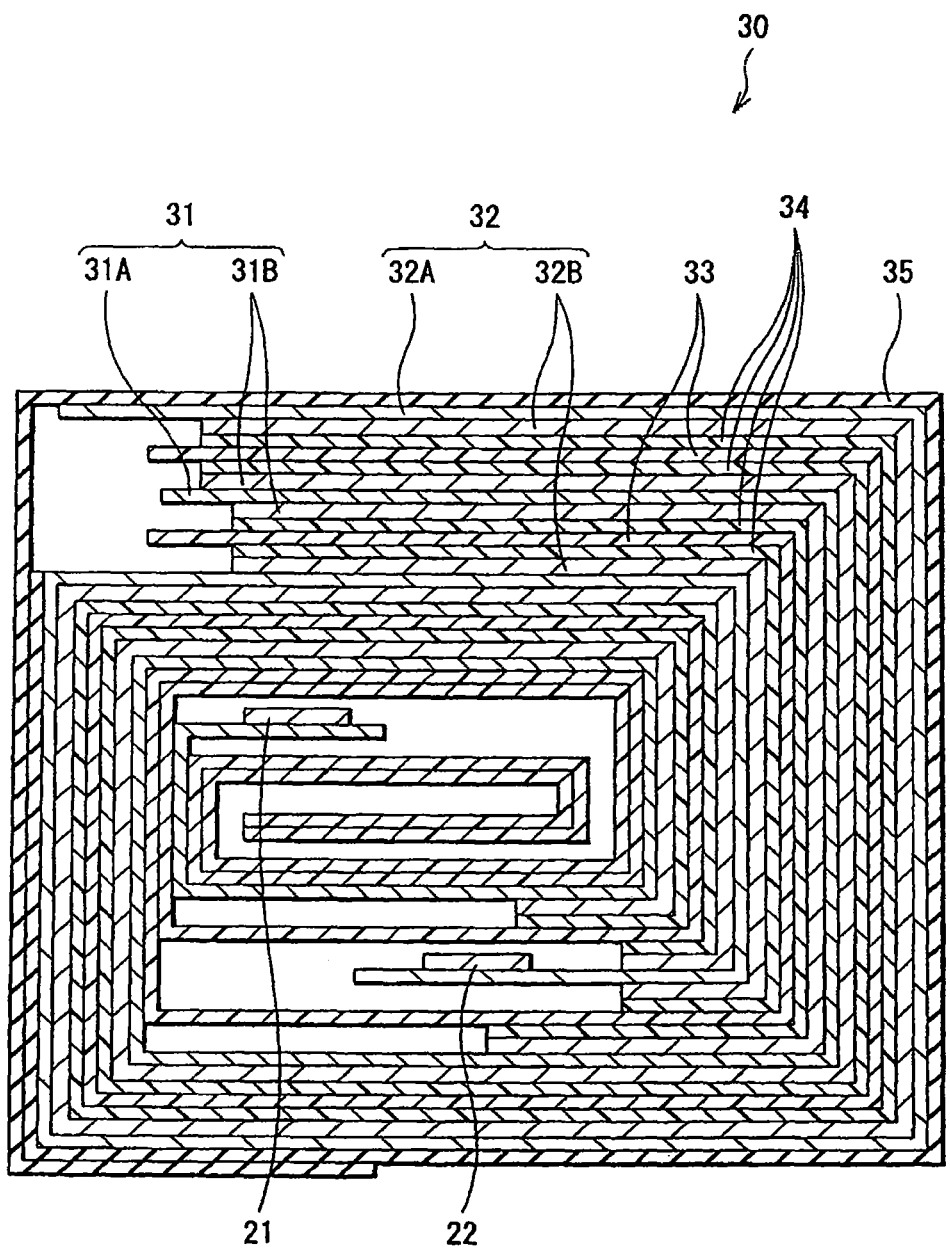
FIG. 3 is a sectional view of a spirally wound electrode body taken along a line I-I of FIG. 2.

FIG. 3 shows a sectional view of the spirally wound electrode body 30 taken along a line I-I of FIG. 2. The spirally wound electrode body 30 is a spirally wound laminate including a cathode 31 and an anode 32 with a separator 33 and an electrolyte layer 34 in between, and an outermost portion of the spirally wound electrode body 30 is protected with a protective tape 35.

The cathode 31 has a structure in which a cathode active material layer 31B is disposed on one side or both sides of a cathode current collector 31A. The anode 32 has a structure in which an anode active material layer 32B is disposed on one side or both sides of an anode current collector 32A, and the anode active material layer 32B and the cathode active material layer 31B are disposed so as to face each other. The structures of the cathode current collector 31A, the cathode active material layer 31B, the anode current collector 32A, the anode active material layer 32B and the separator 33 are the same as those of the cathode current collector 12A, the cathode active material layer 12B, the anode current collector 14A, the anode active material layer 14B and the separator 15, respectively.

The electrolyte layer 34 is made of a so-called gel electrolyte in which a holding body holds an electrolyte solution. The gel electrolyte is preferable, because the gel electrolyte can obtain high ionic conductivity, and can prevent leakage of the battery or expansion due to high temperature. The structure of the electrolyte solution is the same as that in the coin type secondary battery shown in FIG. 1. The holding body is made of, for example, a polymeric material. As the polymeric material, for example, polyvinylidene fluoride is cited.

The secondary battery can be manufactured through the following steps, for example.

At first, the cathode 31 and the anode 32 are formed in the same manner as those in the above-described coin-type secondary battery, and the electrolyte layer 34 in which a holding body holds an electrolyte solution is formed on the cathode active material layer 31B and the anode active material layer 32B. Next, the lead 21 is attached to an end portion of the cathode current collector 31A through welding, and the lead 22 is attached to an end portion of the anode current collector 32A through welding. Then, after the cathode 31 on which the electrolyte layer 34 is formed and the anode 32 on which the electrolyte layer 34 is formed are laminated with the separator 33 in between to form a laminate body, the laminate body is spirally wound in a longitudinal direction, and the protective tape 35 is bonded to an outermost portion of the laminate body so as to form the spirally wound electrode body 30. After that, the spirally wound electrode body 30 is sandwiched between the package members 41 and 42, and edge portions of the package members 41 and 42 are adhered to each other through thermal fusion bonding or the like to seal the spirally wound electrode body 30 in the package members 41 and 42. At this time, the adhesive film 34 is inserted each between the lead 21 and the package member 41, between the lead 21 and the package member 42, between the lead 22 and the package member 41 and between the lead 22 and the package member 42. Thereby, the secondary battery shown in FIGS. 2 and 3 is completed.

Moreover, the secondary battery may be manufactured through the following steps. At first, after the cathode 31 and the anode 32 are formed, the leads 21 and 22 are attached. Next, the cathode 31 and the anode 32 are laminated with the separator 33 in between to form a laminate, and the laminate is spirally wound. Then, the protective tape 35 is bonded to an outermost portion of the laminate so as to form a spirally wound body as a precursor body of the spirally wound electrode body 30. Next, the spirally wound body is sandwiched between the package members 41 and 42, and the edge portions of the package members 41 and 42 except for one side are adhered through thermal fusion bonding to form a pouched package. Then, components for an electrolyte which include the electrolyte solution, a monomer as a material of a polymeric compound and a polymerization initiator and, if necessary, any other material such as a polymerization inhibitor are injected in the package members 41 and 42. After that, an opened portion of the package members 41 and 42 are sealed through thermal fusion bonding under a vacuum atmosphere, and the monomer is polymerized through applying heat to form the polymeric compound, thereby the gel electrolyte layer 34 is formed. Thereby, the secondary battery shown in FIGS. 2 and 3 is completed.

These secondary batteries are used in, for example, mobile electronic devices such as cellular phones and portable personal computers.

At this time, a charge-discharge control device for controlling charge and discharge may be mounted in a mobile electronic device together with the secondary battery. When the charge-discharge control device is used, even if the structures of the cathodes 12 and 31 and the anodes 14 and 32 are not adjusted as described above, in some cases, the Li/Si ratios in the anodes 14 and 32 or the potentials of the anodes 14 and 32 vs. Li at the time of charge and discharge can be controlled as described above. However, charge and discharge may not be able to be controlled as described above only by the charge-discharge control device, and when charge and discharge is controlled only by the charge-discharge control device, the battery voltage will decline, so it is preferable that the cathodes 12 and 31 and the anodes 14 and 32 are adjusted as described above.

Figure 4:
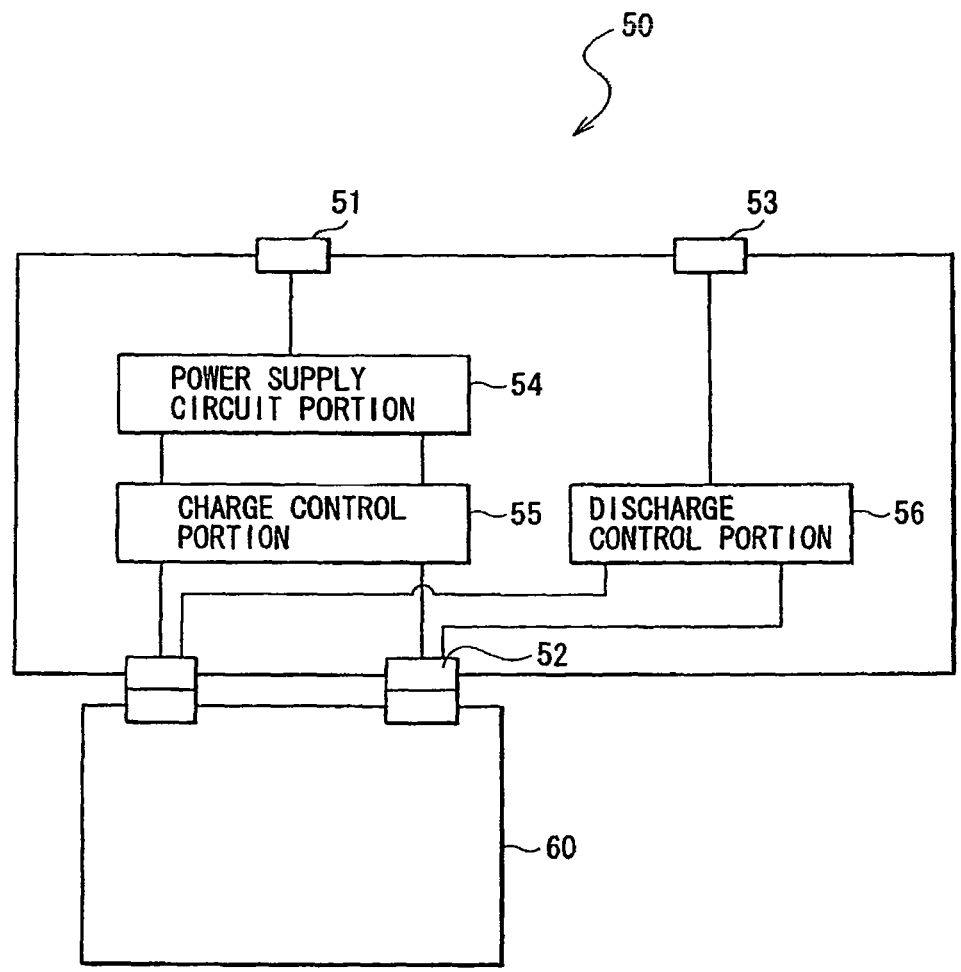
FIG. 4 is a block diagram of a charge-discharge control device used in the secondary batteries shown in FIGS. 1 and 2.

FIG. 4 shows the structure of the charge-discharge control device used in the above-described secondary batteries. A charge-discharge control device 50 comprises a connecting terminal 51 for connecting to a power supply such as a home AC power supply (not shown), a connecting terminal 52 for connecting to a secondary battery 60, and a connecting terminal 53 for connecting to an electronic device or the like. Moreover, the charge-discharge control device 50 comprises a power supply circuit portion 54 connected to the connecting terminal 51, a charge control portion 55 connected to the power supply circuit portion 54 and the connecting terminal 52 and a discharge control portion 56 connected to the connecting terminals 52 and 53.

The power supply circuit portion 54 converts a power supply voltage supplied from the power supply into a predetermined DC voltage, and stably supplies the voltage to the charge control portion 55, and includes a so-called AC-DC converter.

The charge control portion 55 controls charge on the secondary battery 60, and includes, for example, a constant current charge means for carrying out constant-current charge, a constant-voltage charge conversion control means for converting from constant-current charge to constant-voltage charge when the battery voltage reaches a predetermined constant-voltage conversion value during constant-current charge, a constant-voltage charge means for carrying out constant-voltage charge, and a charge termination control means for terminating charge when a current value reaches a predetermined charge termination value during constant-voltage charge.

The constant-voltage charge conversion value in the constant-voltage charge conversion control means is set to a battery voltage value at which the Li/Si ratios in the anodes 14 and 32 become 4.0 or less, or the potentials of the anodes 14 and 42 vs. Li become 0.04 V or more on the basis of, for example, a relationship between a battery voltage determined by charge-discharge curves of the cathodes 12 and 31 and charge-discharge curves of the anodes 14 and 32, and the Li/Si ratios in the anodes 14 and 32 or the potentials of the anodes 14 and 32 vs. Li. More preferably, the constant-voltage charge conversion value is set to a battery voltage value at which the Li/Si ratios in the anodes 14 and 32 become 3.7 or less, or the potentials of the anodes 14 and 32 vs. Li become 0.08 V or more, and more preferably, a battery voltage value at which the Li/Si ratios in the anodes 14 and 32 become 3.5 or less, or the potentials of the anodes 14 and 32 vs. Li become 0.1 V or more. However, as described above, in order to increase the battery capacity, the constant-voltage charge conversion value is preferably set to a battery voltage value at which the Li/Si ratio becomes 3.5 or more, or the potential vs. Li becomes 0.1 V or less.

The discharge control portion 56 controls discharge on the secondary battery, and includes a constant-current discharge means for carrying out constant-current discharge and a discharge termination control means for terminating discharge when the battery voltage reaches a predetermined discharge termination value. The discharge termination value in the discharge termination control means is set to a battery voltage value at which the Li/Si ratios in the anodes 14 and 32 become 0.4 or more, or the potentials of the anodes 14 and 32 vs. Li become 1.4 V or less on the basis of a relationship between a battery voltage determined in the same manner as in the case of the constant-voltage charge conversion value, and the Li/Si ratios in the anodes 14 and 32 or the potentials of the anodes 14 and 32 vs. Li. More preferably, the discharge termination value is set to a battery voltage value at which the Li/Si ratios in the anodes 14 and 32 become 0.43 or more or the potentials of the anodes 14 and 32 vs. Li become 1.2 V or less, and more preferably the Li/Si ratios in the anodes 14 and 32 become 0.46 or more or the potentials of the anodes 14 and 32 become 1.1 V or less. However, as described above, the discharge termination value is preferably set to a battery voltage value at which the Li/Si ratio becomes 0.46 or less, or the potential vs. Li becomes 1.1 V or more.

The secondary battery 60 is charged and discharged through, for example, the following steps by such a charge-discharge control device 50.

At the time of charge, a power supply voltage supplied from a power supply is converted into a predetermined DC voltage and the voltage is supplied to the charge control portion 55 by the power supply circuit portion 54, then charge is controlled by the charge control portion 55. More specifically, at first, constant-current charge is carried out by the constant-current charge means. At this time, the battery voltage is monitored by the constant-voltage charge conversion control means, and when the battery voltage reaches the constant-voltage charge conversion value, charge is converted into constant-voltage charge. Next, constant-voltage charge is carried out by the constant-voltage charge means, and the current value is monitored by the charge termination control means. When the current value reaches the charge termination value, charge is terminated. The constant-voltage charge conversion value is set to, for example, a battery voltage at which the Li/Si ratios in the anodes 14 and 32 become 4.0 or less or the potentials of the anodes 14 and 32 vs. Li become 0.04 V or more, so the Li/Si ratios in the anodes 14 and 32 at the time of charge are controlled to 4.0 or less, or the potentials of the anodes 14 and 32 vs. Li at the time of charge are controlled to 0.04 V or more.

At the time of discharge, discharge is controlled by the discharge control portion 56. More specifically, constant-current discharge is carried out by the constant-current discharge means, and the battery voltage is monitored by the discharge termination control means. When the battery voltage reaches the discharge termination value, discharge is terminated. The discharge termination value is set to, for example, a battery voltage at which the Li/Si ratios in the anodes 14 and 32 become 0.4 or more or the potentials of the anodes 14 and 32 vs. Li become 1.4 V or less, thereby the Li/Si ratios in the anodes 14 and 32 at the time of discharge are controlled to 0.4 or more, or the potentials of the anodes 14 and 32 vs. Li are controlled to 1.4 V or less.

Thus, in the embodiment, the Li/Si ratios in the anodes 14 and 32 are 4.0 or less, or the potentials of the anodes 14 and 32 vs. Li are 0.04 V or more, so an overreaction between the anodes 14 and 32 and the electrolyte and the structural fracture of the anodes 14 and 32 due to expansion and shrinkage can be prevented. Therefore, cycle characteristics can be improved.

In particular, when the Li/Si ratios in the anodes 14 and 32 are 3.7 or less, or the potentials of the anodes 14 and 32 vs. Li are 0.08 V or more, and more specifically, when the Li/Si ratios in the anodes 14 and 32 at the end of charge are 3.5 or less, or the potential of the anodes 14 and 32 vs. Li at the end of charge is 0.1 V or more, a higher effect can be obtained.

Moreover, when the Li/Si ratios in the anodes 14 and 32 are 0.4 or more, or the potentials of the anodes 14 and 32 vs. Li are 1.4 V or less, expansion and shrinkage of the anodes 14 and 32 can be reduced, thereby the structural fracture of the anodes 14 and 32 can be more effectively prevented.

Further, when the Li/Si ratios in the anodes 14 and 32 are 0.43 or more, or the potentials of the anodes 14 and 32 vs. Li are 1.2 V or less, and more specifically when the Li/Si ratios in the anodes 14 and 32 are 0.46 or more, or the potentials of the anodes 14 and 32 vs. Li are 1.1 V or less, a higher effect can be obtained.

In addition, when the electrolyte includes at least one kind selected from the group consisting of a cyclic carbonate having an unsaturated bond and a carbonate derivative containing a halogen atom, the cycle characteristics can be further improved, and storage characteristics and the like can be improved.

EXAMPLES

Examples of the invention will be described in detail below referring to the drawings. In the following examples, like components are donated by like numerals as of the above embodiment.

Examples 1-1 Through 1-6

Coin-type secondary batteries with a diameter of 20 mm and a thickness of 16 mm shown in FIG. 1 were formed. The cathode 12 was formed through the following steps. At first, lithium carbonate ($LiCO_3$) and cobalt carbonate ($CoCO_3$) were mixed at a molar ratio of $LiCO_3:CoCO_3=0.5:1$ to form a mixture, and the mixture was fired for 5 hours at 900° C. in air to obtain lithium cobalt oxide ($LiCoO_2$) as a cathode active material. Next, the lithium cobalt oxide, graphite as an electrical conductor and polyvinylidene fluoride as a binder were mixed at a mass ratio of lithium cobalt oxide:graphite:polyvinylidene fluoride=91:6:3 to form a mixture. Next, the mixture was dispersed in N-methyl-2-pyrrolidone as a dispersion medium to form mixture slurry, and the mixture slurry was applied to the cathode current collector 12A made of aluminum foil with a thickness of 20 µm, and dried, the mixture slurry was pressurized to form the cathode active material layer 12B, and then the cathode current collector 12A and the cathode active material layer 12B were stamped into a circular shape with a diameter of 15 mm.

Moreover, the anode 14 was formed as follows. At first, silicon is deposited on the anode current collector 14A made of electrolytic copper foil having an arithmetic mean roughness (Ra) of 0.5 µm and a thickness of 35 µm by a vapor deposition method to form the anode active material layer 14B. After the anode active material layer 14B was heated in a vacuum, and dried, the anode current collector 14A and the anode active material layer 14B were stamped into a circular shape with a diameter of 16 mm.

At that time, a ratio between the amount of the cathode active material layer 12B and the amount of the anode active material layer 14B, that is, a molar ratio of the cathode active material to the anode active material was changed in Examples 1-1 through 1-6, thereby the Li/Si ratio in the anode 14 or the potential of the anode 14 vs. Li at the end of charge and at the end of discharge was changed.

The formed cathode 12 and the formed anode 14 with the separator 15 made of a polyethylene film in between were mounted on the package can 11, and the electrolyte solution was injected from above, and the package cup 13 was laid on the package can 11, and the package can 11 and the package cup 13 were caulked to seal the cathode 12 and the anode 14. As the electrolyte solution, an electrolyte solution including a solvent which included ethylene carbonate (EC) and dim- $mA/cm^2$ until a battery voltage reached 4.2 V, then charge was continued at a constant voltage of 4.2 V until a current density reached 0.04 $mA/cm^2$. Then, the secondary batteries were discharged at a constant current density of 1 $mA/cm^2$ until the battery voltage reached 2 V to 3 V so that the Li/Si ratio in the anode 14 at the end of discharge became 0.4 or more or the potential of the anode 14 vs. Li at the end of discharge became 1.4 V or less.

In other words, in Examples 1-1 through 1-6, while the molar ratio of the cathode active material to the anode active material was adjusted so that at a battery voltage of 4.2 V, the Li/Si ratio in the anode 14 at the end of charge became 4.0 or less or the potential of the anode 14 vs. Li became 0.04 V or more, a relationship between the battery voltage at the time of discharge, the Li/Si ratio in the anode 14 and the potential of the anode 14 vs. Li was determined by a charge-discharge curve of the cathode 12 and a charge-discharge curve of the anode 14, and a discharge termination value at which discharge is terminated was set so that the Li/Si ratio in the anode 14 at the end of discharge became 0.4 or more or the potential of the anode 14 vs. Li at the end of discharge became 1.4 V or less.

Moreover, the anode 14 was taken out of each of the secondary batteries of Examples 1-1 through 1-6 after charge under the above conditions and after discharge under the above conditions to analyze the Li/Si ratio in the anode active material layer 14B by an ICP method. Further, the anode 14 was taken out after charge under the above conditions and after discharge under the above conditions, and then the potential of the anode 14 was measured by using the anode 14 as a working electrode and a lithium metal plate as a counter electrode. The obtained results are shown in Table 1.

TABLE 1

|  | METHOD OF FORMING ANODE | AT THE END OF CHARGE | | AT THE END OF THE DISCHARGE | | |
| --- | --- | --- | --- | --- | --- | --- |
|  |  | Li/Si RATIO IN ANODE (MOLAR RATIO) | POTENTIAL OF ANODE VS. Li (V) | Li/Si RATIO IN ANODE (MOLAR RATIO) | POTENTIAL OF ANODE VS. Li (V) | CAPACITY RETENTION RATIO (%) |
| EXAMPLE 1-1 | VAPOR DEPOSITION | 4.0 | 0.04 | 0.40 | 1.4 | 70.1 |
| EXAMPLE 1-2 | VAPOR DEPOSITION | 3.95 | 0.05 | 0.41 | 1.3 | 71.4 |
| EXAMPLE 1-3 | VAPOR DEPOSITION | 3.8 | 0.07 | 0.41 | 1.3 | 81.4 |
| EXAMPLE 1-4 | VAPOR DEPOSITION | 3.5 | 0.1 | 0.43 | 1.2 | 94.8 |
| EXAMPLE 1-5 | VAPOR DEPOSITION | 3.5 | 0.1 | 0.46 | 1.1 | 95.8 |
| EXAMPLE 1-6 | VAPOR DEPOSITION | 3.7 | 0.08 | 0.46 | 1.1 | 90.4 |
| COMPARATIVE EXAMPLE 1-1 | VAPOR DEPOSITION | 4.3 | 0.01 | 0.38 | 1.5 | 47.5 |

Electroylyte solution: EC + DMC + $LiPF_6$ ethyl carbonate (DMC) at a mass ratio of 1:1, and $LiPF_6$ as a lithium salt which was dissolved in the solvent at a concentration of 1 mol/l was used.

A charge-discharge test was carried out on the secondary batteries of Examples 1-1 through 1-6 at 25° C. to determine their capacity retention ratios in the 100th cycle. The capacity retention ratio in the 100th cycle was determined as a ratio of a discharge capacity in the 100th cycle to the initial discharge capacity, that is, (the discharge capacity in the 100th cycle/the initial discharge capacity) %100. At that time, the secondary batteries were charged at a constant current density of 1

As Comparative Example 1-1 relative to Example 1-1 through 1-6, a secondary battery was formed as in the case of Examples 1-1 through 1-6, except that the molar ratio of the cathode active material to the anode active material was changed. A charge-discharge test was carried out on the secondary battery of Comparative Example 1-1 as in the case of Examples 1-1 through 1-6 to determine its capacity retention ratio in the 100th cycle and measure the Li/Si ratio in the anode and the potential of the anode vs. Li after charge under the above conditions and after discharge under the above conditions. The results are also shown in Table 1.

It was obvious from Table 1 that in Examples 1-1 through 1-6 in which the Li/Si ratio in the anode 14 at the end of charge was 4.0 or less, or the potential of the anode 14 vs. Li at the end of charge was 0.04 V or more and the Li/Si ratio in the anode 14 at the end of discharge was 0.4 or more or the potential of the anode 14 vs. Li at the end of discharge was 1.4 V or less, a higher capacity retention ratio was obtained, compared to Comparative Example 1-1. Moreover, when the Li/Si ratio in the anode 14 at the end of charge was 3.7 or less or the potential of the anode 14 vs. Li at the end of charge was 0.08 V or more, and the Li/Si ratio in the anode 14 at the end of discharge was 0.43 or more or the potential of the anode 14 vs. Li at the end of discharge was 1.2 V or less, a higher capacity retention ratio of 90% or more was obtained, and when the Li/Si ratio in the anode 14 was 3.5 or the potential of the anode 14 vs. Li was 0.1 V, and the Li/Si ratio in the anode 14 at the end of discharge was 0.46 or the potential of the anode 14 vs. Li at the end of discharge was 1.1 V, the highest capacity retention ratio was obtained.

In other words, it was found out that when the Li/Si ratio in the anode 14 at the end of charge was 4.0 or less, or the potential of the anode 14 vs. Li at the end of charge was 0.04 V or more, and the Li/Si ratio in the anode 14 at the end of discharge was 0.4 or more, or the potential of the anode 14 vs. Li at the end of discharge was 1.4 V or less, cycle characteristics could be improved. Moreover, it was found out that when the Li/Si ratio in the anode 14 at the end of charge was 3.7 or less or the potential of the anode 14 vs. Li at the end of charge was 0.08 V or more, and more specifically when the Li/Si ratio in the anode 14 at the end of charge was 3.5, or the potential of the anode 14 vs. Li at the end of charge was 0.1 V, or when the Li/Si ratio in the anode 14 at the end of discharge was 0.43 or more, or the potential of the anode 14 vs. Li at the end of discharge was 1.2 V or less, and more specifically when the Li/Si ratio in the anode 14 at the end of discharge was 0.46, or the potential of the anode 14 vs. Li at the end of discharge was 1.1 V, higher cycle characteristics could be obtained.

Examples 2-1 Through 2-3

Secondary batteries were formed as in the case of Example 1-5 or Example 1-6, except that the composition of the electrolyte solution was changed. As the electrolyte solution, an electrolyte solution formed through adding 1,3-dioxol-2-one (VC) or 4-vinyl-1,3-dioxolane-2-one (VEC) to the electrolyte solution used in Examples 1-1 through 1-6, that is, the electrolyte solution including the solvent which included ethylene carbonate and dimethyl carbonate at a mass ratio of 1:1 and $LiPF_6$ which was dissolved in the solvent at a concentration of 1 mol/l was used. At that time, the contents of VC and VEC in the electrolyte solution were changed as shown in Tables 2 and 3 in Examples 2-1 through 2-3.

A charge-discharge test was carried out on the secondary batteries of Examples 2-1 through 2-3 as in the case of Examples 1-5 and 1-6 to determine their capacity retention ratios in the 100th cycle and measure the Li/Si ratio in the anode 14 and the potential of the anode 14 vs. Li after charge under the above conditions and after discharge under the above conditions. The obtained results are shown in Tables 2 and 3 together with the results of Examples 1-5 and 1-6.

TABLE 2

| | METHOD OF FORMING ANODE | CONTENT IN ELECTROLYTE SOLUTION (wt %) | | AT THE END OF CHARGE | | AT THE END OF DISCHARGE | | CAPACITY RETENTION RATIO (%) |
|---|---|---|---|---|---|---|---|---|
| | | VC | VEC | Li/Si RATIO IN ANODE (MOLAR RATIO) | POTENTIAL OF ANODE VS. Li (V) | Li/Si RATIO IN ANODE (MOLAR RATIO) | POTENTIAL OF ANODE VS. Li (V) | |
| EXAMPLE 1-5 | VAPOR DEPOSITION | — | — | 3.5 | 0.1 | 0.46 | 1.1 | 95.8 |
| EXAMPLE 2-1 | VAPOR DEPOSITION | 2 | — | 3.5 | 0.1 | 0.46 | 1.1 | 98.7 |

TABLE 3

| | METHOD OF FORMING ANODE | CONTENT IN ELECTROLYTE SOLUTION (wt %) | | AT THE END OF CHARGE | | AT THE END OF DISCHARGE | | CAPACITY RETENTION RATIO (%) |
|---|---|---|---|---|---|---|---|---|
| | | VC | VEC | Li/Si RATIO IN ANODE (MOLAR RATIO) | POTENTIAL OF ANODE VS. Li (V) | Li/Si RATIO IN ANODE (MOLAR RATIO) | POTENTIAL OF ANODE VS. Li (V) | |
| EXAMPLE 1-6 | VAPOR DEPOSITION | — | — | 3.7 | 0.08 | 0.46 | 1.1 | 90.4 |
| EXAMPLE 2-2 | VAPOR DEPOSITION | 15 | — | 3.7 | 0.08 | 0.46 | 1.1 | 94.2 |
| EXAMPLE 2-3 | VAPOR DEPOSITION | — | 15 | 3.7 | 0.08 | 0.46 | 1.1 | 94.0 |

As shown in Tables 2 and 3, in Examples 2-1 through 2-3 in which a cyclic carbonate having an unsaturated bond such as 1,3-dioxol-2-one or 4-vinyl-1,3-dioxolane-2-one was added, a higher capacity retention ratio was obtained, compared to Examples 1-5 and 1-6. In other words, it was found out that when a cyclic carbonate having an unsaturated bond was added to the electrolyte solution, the cycle characteristics could be further improved.

Examples 3-1 Through 3-10

Secondary batteries were formed as in the case of Example 1-1, except that the composition of the electrolyte solution was changed. As the electrolyte solution, an electrolyte solution formed through mixing ethylene carbonate (EC), 4-fluoro-1,3-dioxolane-2-one (FEC), dimethyl carbonate (DMC), diethyl carbonate (DEC) or 1,3-dioxol-2-one (VC) at a mass ratio shown in Table 4 to form a solvent, and then dissolving $LiPF_6$ in the solvent at a concentration of 1 mol/l was used.

A charge-discharge test was carried out on the secondary batteries of Examples 3-1 through 3-10 as in the case of Example 1-1 to determine their capacity retention ratios in the 100th cycle and measure the Li/Si ratio in the anode 14 and the potential of the anode 14 vs. Li after charge under the above conditions and after discharge under the above conditions. The obtained results are shown in Table 4 together with the results of Example 1-1. The Li/Si ratio in the anode 14 and the potential of the anode 14 vs. Li at the end of charge and at the end of discharge were the same as those in Example 1-1, although they are not shown in Table 4.

As shown in Table 4, it was found out that in Examples 3-1 through 3-10 in which 4-fluoro-1,3-dioxolane-2-one was used, a higher capacity retention ratio was obtained, compared to Example 1-1. In other words, it was found out that when a carbonate derivative containing a halogen atom was used in the electrolyte solution, the cycle characteristics could be further improved.

Examples 4-1 Through 4-8

Secondary batteries were formed as in the case of Example 1-1, except that the composition of the electrolyte solution was changed. In the electrolyte solution, the same solvent as that in Examples 4-2 through 4-6 was used, and the kind of the lithium salt was changed as shown in Table 5. A charge-discharge test was carried out on the secondary batteries of Examples 4-1 through 4-8 as in the case of Example 1-1 to determine their capacity retention ratios in the 100th cycle and measure the Li/Si ratio in the anode 14 and the potential of the anode 14 vs. Li after charge under the above conditions and after discharge under the above conditions. The obtained results are shown in Table 5 together with the results of Examples 4-2 through 4-6. The Li/Si ratio in the anode 14 and the potential of the anode 14 vs. Li at the end of charge and at the end of discharge were the same as those in Example 1-1, although they are not shown in Table 5.

TABLE 4

| | METHOD OF FORMING ANODE | COMPOSITION OF SOLVENT (MASS RATIO) | | | | | CAPACITY RETENTION RATIO (%) |
|---|---|---|---|---|---|---|---|
| | | EC | FEC | DMC | DEC | VC | |
| EXAMPLE 1-1 | VAPOR DEPOSITION | 1.0 | 0 | 1.0 | 0 | 0 | 70.1 |
| EXAMPLE 3-1 | VAPOR DEPOSITION | 0.95 | 0.05 | 1.0 | 0 | 0 | 97.2 |
| EXAMPLE 3-2 | VAPOR DEPOSITION | 0.9 | 0.1 | 1.0 | 0 | 0 | 97.6 |
| EXAMPLE 3-3 | VAPOR DEPOSITION | 0.7 | 0.3 | 1.0 | 0 | 0 | 97.8 |
| EXAMPLE 3-4 | VAPOR DEPOSITION | 0.5 | 0.5 | 1.0 | 0 | 0 | 99.2 |
| EXAMPLE 3-5 | VAPOR DEPOSITION | 0.2 | 0.8 | 1.0 | 0 | 0 | 99.2 |
| EXAMPLE 3-6 | VAPOR DEPOSITION | 0 | 1.0 | 1.0 | 0 | 0 | 99.2 |
| EXAMPLE 3-7 | VAPOR DEPOSITION | 0 | 1.0 | 0 | 1.0 | 0 | 99.1 |
| EXAMPLE 3-8 | VAPOR DEPOSITION | 0.6 | 0.6 | 0.4 | 0.4 | 0 | 97.8 |
| EXAMPLE 3-9 | VAPOR DEPOSITION | 0 | 1.0 | 0 | 0 | 0 | 97.4 |
| EXAMPLE 3-10 | VAPOR DEPOSITION | 0.45 | 0.5 | 1.0 | 0 | 0.05 | 99.2 |

TABLE 5

| | METHOD OF FORMING ANODE | COMPOSITION OF SOLVENT (MASS RATIO) | | | | | LITHIUM SALT (mol/l) | CAPACITY RETENTION RATIO (%) |
|---|---|---|---|---|---|---|---|---|
| | | EC | FEC | DMC | DEC | VC | | 97.6 |
| EXAMPLE 3-2 | VAPOR DEPOSITION | 0.9 | 0.1 | 1.0 | 0 | 0 | $LiPF_6$: 1.0 | 97.8 |
| EXAMPLE 4-1 | VAPOR DEPOSITION | 0.9 | 0.1 | 1.0 | 0 | 0 | $LiPF_6$: 0.9 $Li(CF_3SO_2)_2N$: 01 | 97.8 |
| EXAMPLE 3-3 | VAPOR DEPOSITION | 0.7 | 0.3 | 1.0 | 0 | 0 | $LiPF_6$: 1.0 | 98.0 |
| EXAMPLE 4-2 | VAPOR DEPOSITION | 0.7 | 0.3 | 1.0 | 0 | 0 | $LiPF_6$: 0.9 $Li(CF_3SO_2)_2N$: 01 | 99.2 |
| EXAMPLE 3-4 | VAPOR DEPOSITION | 0.5 | 0.5 | 1.0 | 0 | 0 | $LiPF_6$: 1.0 | 99.2 |
| EXAMPLE 4-3 | VAPOR DEPOSITION | 0.5 | 0.5 | 1.0 | 0 | 0 | $LiPF_6$: 0.9 $Li(CF_3SO_2)_2N$: 01 | 99.2 |
| EXAMPLE 4-4 | VAPOR DEPOSITION | 0.5 | 0.5 | 1.0 | 0 | 0 | $LiPF_6$: 0.9 CHEMICAL FORMULA 2: 0.1 | 99.2 |
| EXAMPLE 4-5 | VAPOR DEPOSITION | 0.5 | 0.5 | 1.0 | 0 | 0 | $LiPF_6$: 0.9 CHEMICAL FORMULA 2: 0.1 | 99.0 |
| EXAMPLE 3-5 | VAPOR DEPOSITION | 0.2 | 0.8 | 1.0 | 0 | 0 | $LiPF_6$: 1.0 | 99.2 |
| EXAMPLE 4-6 | VAPOR DEPOSITION | 0.2 | 0.8 | 1.0 | 0 | 0 | $LiPF_6$: 0.8 $Li(CF_3SO_2)_2N$: 01 CHEMICAL FORMULA 2: 0.1 | 99.2 |
| EXAMPLE 4-7 | VAPOR DEPOSITION | 0.2 | 0.8 | 1.0 | 0 | 0 | $LiPF_6$: 0.9 $Li(C_2F_5SO_2)_2N$: 05 CHEMICAL FORMULA 1: 0.05 | 99.2 |
| EXAMPLE 3-6 | VAPOR DEPOSITION | 0 | 1.0 | 1.0 | 0 | 0 | $LiPF_6$: 1.0 | 99.2 |
| EXAMPLE 4-8 | VAPOR DEPOSITION | 0 | 1.0 | 1.0 | 0 | 0 | $LiPF_6$: 0.9 $Li(CF_3SO_2)_2N$: 0.1 | 99.2 |

Chemical Formula 1: lithium bis(oxalate) borate
Chemical Formula 2: lithium difluoro[oxalate-O,O'] borate As shown in Table 5, it was found out that even if other lithium salts were used, the same results could be obtained.

Examples 5-1 Through 5-8

Secondary batteries of Examples 5-1 and 5-2 were formed as in the case of Examples 1-1 through 1-6, except that the anode 14 was formed by a sintering method. The anode 14 was formed as follows. At first, 90 wt % of silicon powder with an average particle diameter of 1 μm as an anode active material and 10 wt % of polyvinylidene fluoride as a binder were mixed to prepare a mixture, and the mixture was dispersed in N-methyl-2-pyrrolidone as a dispersion medium to form mixture slurry. Next, after the mixture slurry was applied to the anode current collector 14A made of electrolytic copper foil with a thickness of 18 μm, dried and pressurized, the mixture slurry was heated for 12 hours at 400° C. under a vacuum atmosphere to form the anode active material layer 14B.

A secondary battery of Example 5-3 was formed as in the case of Example 5-2, except that the same electrolyte solution as that in Example 2-1 was used. More specifically, an electrolyte solution including 2 wt % of 1,3-dioxol-2-one (VC) was used.

Secondary batteries of Examples 5-4 through 5-8 were formed as in the case of Examples 5-2, except that the same electrolyte solution as that in Examples 3-1 through 3-5 was used. More specifically, as the solvent, a mixture including ethylene carbonate (EC), 4-fluoro-1,3-dioxolane-2-one (FEC) and dimethyl carbonate (DMC) was used, and the content of 4-fluoro-1,3-dioxolane-2-one was changed.

Moreover, as Comparative Example 5-1 relative to Examples 5-1 and 5-2, a secondary battery was formed as in the case of Examples 5-1 and 5-2, except that the molar ratio of the cathode active material to the anode active material was changed.

A charge-discharge test was carried out on the secondary batteries of Examples 5-1 through 5-8 and Comparative Example 5-1 to determine their capacity retention ratios in the 100th cycle and measure the Li/Si ratio in the anode 14 and the potential of the anode 14 vs. Li after charge under the above conditions and after discharge under the above conditions. The obtained results are shown in Tables 6 through 8. In Table 8, the Li/Si ratio in the anode 14 and the potential of the anode 14 vs. Li at the end of charge and at the end of discharge are not shown; however, they were the same in each example as those in Example 5-2.

TABLE 6

|  | METHOD OF FORMING ANODE | AT THE END OF CHARGE | | AT THE END OF DISCHARGE | | CAPACITY RETENTION RATIO (%) |
|---|---|---|---|---|---|---|
|  |  | Li/Si RATIO IN ANODE (MOLAR RATIO) | POTENTIAL OF ANODE VS. Li (V) | Li/Si RATIO IN ANODE (MOLAR RATIO) | POTENTIAL OF ANODE VS. Li (V) |  |
| EXAMPLE 5-1 | SINTERING | 3.95 | 0.05 | 0.41 | 1.3 | 71.4 |
| EXAMPLE 5-2 | SINTERING | 3.5 | 0.1 | 0.42 | 1.25 | 76.7 |
| COMPARATIVE EXAMPLE 5-1 | SINTERING | 4.3 | 0.01 | 0.42 | 1.25 | 33.9 |

Electrolyte solution: EC + DMC + LiPF$_6$

TABLE 7

|  | METHOD OF FORMING ANODE | CONTENT OF VC (wt %) | AT THE END OF CHARGE | | AT THE END OF DISCHARGE | | CAPACITY RETENTION RATIO (%) |
|---|---|---|---|---|---|---|---|
|  |  |  | Li/Si RATIO IN ANODE (MOLAR RATIO) | POTENTIAL OF ANODE VS. Li (V) | Li/Si RATIO IN ANODE (MOLAR RATIO) | POTENTIAL OF ANODE VS. Li (V) |  |
| EXAMPLE 5-2 | SINTERING | — | 3.5 | 0.1 | 0.42 | 1.25 | 76.7 |
| EXAMPLE 5-3 | SINTERING | 2 | 3.5 | 0.1 | 0.42 | 1.25 | 87.3 |

TABLE 8

|  | METHOD OF FORMING ANODE | COMPOSITION OF SOLVENT (MASS RATIO) | | | CAPACITY RETENTION RATIO (%) |
|---|---|---|---|---|---|
|  |  | EC | FEC | DMC |  |
| EXAMPLE 5-2 | SINTERING | 1.0 | 0 | 1.0 | 76.7 |
| EXAMPLE 5-4 | SINTERING | 0.95 | 0.05 | 1.0 | 85.0 |
| EXAMPLE 5-5 | SINTERING | 0.9 | 0.1 | 1.0 | 91.0 |
| EXAMPLE 5-6 | SINTERING | 0.7 | 0.3 | 1.0 | 93.0 |
| EXAMPLE 5-7 | SINTERING | 0.5 | 0.5 | 1.0 | 96.0 |
| EXAMPLE 5-8 | SINTERING | 0.2 | 0.8 | 1.0 | 98.0 |

As shown in Tables 6 through 8, in Examples 5-1 through 5-8, the same results as those in Examples 1-1 through 1-6, 2-1 and 3-1 through 3-5 in which the anode 14 was formed by vapor deposition were obtained. In other words, it was found out that even in the case where the anode 14 was formed by a sintering method, when the Li/Si ratio in the anode 14 at the end of charge was 4.0 or less or the potential of the anode 14 vs. Li at the end of charge was 0.04 V or more, and the Li/Si ratio in the anode 14 at the end of discharge was 0.4 or more or the potential of the anode 14 vs. Li at the end of discharge was 1.4 V or less, the cycle characteristics could be improved. Moreover, it was found out that when a cyclic carbonate having an unsaturated bond or a carbonate derivative containing a halogen atom was used in the electrolyte solution, the cycle characteristics could be further improved.

Example 6-1

A secondary battery was formed as in the case of Examples 1-1 through 1-6, except that the anode 14 was formed by a coating method. The anode 14 was formed as follows. At first, 80 wt % of silicon power with an average particle diameter of 1 .mu.m as an anode active material, 10 wt % of polyvinylidene fluoride as a binder and 10 wt % of flake natural graphite as an electrical conductor were mixed to prepare a mixture, and the mixture was dispersed in N-methyl-2-pyrrolidone as a dispersion medium to form mixture slurry. Next, after the mixture slurry was applied to the anode current collector 14A made of electrolytic copper foil with a thickness of 18 μm, dried and pressurized, the mixture slurry was dried for 5 hours at 100° C. under a vacuum atmosphere to form the anode active material layer 14B. Moreover, as Comparative Example 6-1 relative to Example 6-1, a secondary battery was formed as in the case of Example 6-1, except that the molar ratio of the cathode active material to the anode active material was changed.

A charge-discharge test was carried out on the secondary batteries of Example 6-1 and Comparative Example 6-1 as in the case of Examples 1-1 through 1-6 to determine their capacity retention ratios in the 100th cycle and measure the Li/Si ratio in the anode 14 and the potential of the anode 14 vs. Li after charge under the above conditions and after discharge under the above conditions. The obtained results are shown in Table 9.

TABLE 9

|  | METHOD OF FORMING ANODE | AT THE END OF CHARGE | | AT THE END OF DISCHARGE | | |
|---|---|---|---|---|---|---|
|  |  | Li/Si RATIO IN ANODE (MOLAR RATIO) | POTENTIAL OF ANODE VS. Li (V) | Li/Si RATIO IN ANODE (MOLAR RATIO) | POTENTIAL OF ANODE VS. Li (V) | CAPACITY RETENTION RATIO (%) |
| EXAMPLE 6-1 | COATING | 3.5 | 0.1 | 0.46 | 1.1 | 56.8 |
| COMPARATIVE EXAMPLE 6-1 | COATING | 4.05 | 0.01 | 0.41 | 1.3 | 12.5 |

Electrolyte solution: EC + DMC + $LiPF_6$

It was obvious from Table 9 that in Example 6-1, a higher capacity retention ratio was obtained, compared to Comparative Example 6-1. In other words, it was found out that even in the case where the anode 14 was formed by a coating method, when the Li/Si ratio in the anode 14 at the end of charge was 4.0 or less or the potential of the anode 14 vs. Li at the end of charge was 0.04 V or more, and the Li/Si ratio in the anode 14 at the end of discharge was 0.4 or more or the potential of the anode 14 vs. Li at the end of discharge was 1.4 V or less, the cycle characteristics could be improved.

Examples 7-1 Through 7-3

Secondary batteries were formed as in the case of Examples 1-1 through 1-6, except that the composition of the anode active material layer 14B was changed as shown in Table 10. More specifically, the anode active material layer 14B was formed of SiW in Example 7-1, $Si_4Cu$ in Example 7-2 and $Si_{0.99}B_{0.01}$ in Example 7-3 by a vapor deposition method. They are indicated by a molar ratio.

A charge-discharge test was carried out on the secondary batteries of Examples 7-1 through 7-3 as in the case of Examples 1-1 through 1-6 to determine their initial discharge capacities and their capacity retention ratios in the 100th cycle and measure the Li/Si ratio in the anode 14 and the potential of the anode 14 vs. Li after charge under the above conditions and after discharge under the above conditions. The obtained results are shown in Table 10 together with the results of Example 1-2.

tion to silicon, when the Li/Si ratio in the anode 14 or the potential of the anode 14 vs. Li were as described above, the cycle characteristics could be improved.

Moreover, when the content of silicon in the anode active material layer 14B was reduced, there was a tendency of the capacity retention ratio to be improved; however the capacity declined. In other words, it was found out that the content of silicon in the anode active material layer 14B was preferably 50 mol % or more, more preferably 75 mol % or more and more preferably 90 mol %.

Example 8-1

A winding type secondary battery shown in FIGS. 2 and 3 was formed. At first, the cathode 31 was formed as in the case of Examples 1-1 through 1-5, and the anode 32 was formed through forming the anode active material layer 32B made of silicon with a thickness of 3 .mu.m on the anode current collector 32A made of electrolytic copper foil by electron beam evaporation. Next, 10 wt % of polyvinylidene fluoride as a block copolymer with a weight-average molecular weight of 600,000 and 60 wt % of dimethyl carbonate as a solvent of a polymeric material were mixed to and dissolved in 30 wt % of an electrolyte solution including 40 wt % of γ-butyrolactone (γ-BL), 40 wt % of ethylene carbonate (EC), 5 wt % of 1,3-dioxol-2-one (VC) and 15 wt % of $LiPF_6$ to form a precursor solution. Then, the precursor solution was applied to each of the cathode 31 and the anode 32, the

TABLE 10

|  | ANODE ACTIVE MATERIAL LAYER | AT THE END OF CHARGE | | AT THE END OF DISCHARGE | | | |
|---|---|---|---|---|---|---|---|
|  |  | Li/Si RATIO IN ANODE (MOLAR RATIO) | POTENTIAL OF ANODE VS. Li (V) | Li/Si RATIO IN ANODE (MOLAR RATIO) | POTENTIAL OF ANODE VS. Li (V) | CAPACITY RETENTION RATIO (%) | INITIAL DISCHARGE CAPACITY (mAH/g) |
| EXAMPLE 7-1 | SiW | 3.92 | 0.08 | 0.41 | 1.3 | 73.5 | 1805 |
| EXAMPLE 7-2 | $Si_4Cu$ | 3.92 | 0.08 | 0.41 | 1.3 | 72.1 | 2654 |
| EXAMPLE 7-3 | $Si_{0.99}B_{0.01}$ | 3.95 | 0.05 | 0.41 | 1.3 | 71.0 | 3527 |
| EXAMPLE 1-2 | Si | 3.95 | 0.05 | 0.41 | 1.3 | 71.4 | 3570 |

As shown in Table 10, in Examples 7-1 through 7-3, superior results were obtained as in the case of Example 1-2. In other words, it was found out that in the case where the anode active material layer 14B included another element in addicathode 31 and the anode 32 were left for 8 hours at room temperature to volatilize dimethyl carbonate, thereby the electrolyte layer 34 was formed on the cathode 31 and the anode 32.

Next, the cathode 31 on which the electrolyte layer 34 was formed and the anode 32 on which the electrolyte layer 34 was formed were cut into a strip shape, and the lead 21 was attached to the cathode 31, and the lead 22 was attached to the anode 32. After that, the cathode 31 on which the electrolyte layer 34 was formed and the anode 32 on which the electrolyte layer 34 was formed were laminated with the separator 33 in between to form a laminate body, and the laminate body was spirally wound to form the spirally wound electrode body 30. Then, the spirally wound electrode body 30 was covered with the package members 41 and 42.

As Comparative Example 8-1 relative to Example 8-1, a secondary battery was formed as in the case of Example 8-1, except that the molar ratio of the cathode active material to the anode active material was changed.

A charge-discharge test was carried out on the secondary batteries of Example 8-1 and Comparative Example 8-1 as in the case of Example 1-1 through 1-6 to determine their capacity retention ratios in the 100th cycle and measure the Li/Si ratio in the anode 32 and the potential of the anode 32 vs. Li after charge under the above conditions and after discharge under the above conditions. At that time, the Li/Si ratio in the anode 32 and the potential of anode 32 vs. Li were measured by using the circular shaped anode 32 which was formed through stamping a central portion of the anode 32 into a circular shape with a diameter of 15 mm. The results are shown in Table 11.

case where the cathode 31 and the anode 32 were spirally wound, when the Li/Si ratio in the anode 32 or the potential of the anode 32 vs. Li were as described above, the cycle characteristics could be improved.

Examples 9-1 Through 9-9

Secondary batteries were formed as in the case of Example 8-1, except that the composition of the electrolyte solution was changed. As the electrolyte solution, an electrolyte solution formed through mixing ethylene carbonate (EC), 4-fluoro-1,3-dioxolane-2-one (FEC) or 1,3-dioxol-2-one (VC) at a mass ratio shown in Table 12 to form a solvent, and then dissolving the lithium salt in the solvent at a concentration of 1 mol/l was used. The kind of the lithium salt was changed as shown in Table 12.

The secondary batteries of Examples 9-1 through 9-9 and Example 8-1 were charged and discharged under the same conditions as those in Example 1-1 to examine the storage characteristics. More specifically, 10 charge-discharge cycles were carried out to determine the discharge capacity in the 10th cycle as a capacity before storage. Then, the secondary batteries were charged again, and the secondary batteries were stored for 20 days at 70° C., and then the secondary batteries were discharged. Next, one charge-discharge cycle was carried out again to determine the discharge capacity as a capacity after storage. As the storage characteristics, a ratio of

TABLE 11

|  | METHOD OF FORMING ANODE | AT THE END OF CHARGE | | AT THE END OF DISCHARGE | | CAPACITY RETENTION RATIO (%) |
|---|---|---|---|---|---|---|
|  |  | Li/Si RATIO IN ANODE (MOLAR RATIO) | POTENTIAL OF ANODE VS. Li (V) | Li/Si RATIO IN ANODE (MOLAR RATIO) | POTENTIAL OF ANODE VS. Li (V) |  |
| EXAMPLE 8-1 | VAPOR DEPOSITION | 3.6 | 0.12 | 0.41 | 1.3 | 80.3 |
| COMPARATIVE EXAMPLE 8-1 | VAPOR DEPOSITION | 4.05 | 0.01 | 0.41 | 1.3 | 44.1 |

Electrolyte: γ-BL + EC + VC + LiPF$_6$ + PVDF

As shown in Table 11, in Example 8-1, a higher capacity retention ratio was obtained, compared to Comparative Example 8-1. In other words, it was found out that even in the case where a so-called gel electrolyte was used, or even in the the capacity after storage to the capacity before storage, that is, (the capacity after storage/the capacity before storage)×100 was determined as a capacity retention ratio after storage. The obtained results are shown in Table 12.

TABLE 12

|  | COMPOSITION OF SOLVENT (MASS RATIO) | | | LITHIUM SALT (mol/l) | CAPACITY RETENTION RATIO AFTER STORAGE (%) |
|---|---|---|---|---|---|
|  | EC | FEC | VC | | |
| EXAMPLE 9-1 | 0.45 | 0.5 | 0.05 | LiPF$_6$: 1.0 | 88 |
| EXAMPLE 9-2 | 0.9 | 0.1 | 0 | LiPF$_6$: 0.9 Li(CF$_3$SO$_2$)$_2$N: 01 | 87 |
| EXAMPLE 9-3 | 0.7 | 0.3 | 0 | LiPF$_6$: 0.9 Li(CF$_3$SO$_2$)$_2$N: 01 | 88 |
| EXAMPLE 9-4 | 0.5 | 0.5 | 0 | LiPF$_6$: 0.9 Li(CF$_3$SO$_2$)$_2$N: 01 | 89 |
| EXAMPLE 9-5 | 0.5 | 0.5 | 0 | LiPF$_6$: 0.9 CHEMICAL FORMULA 2: 0.1 | 87 |
| EXAMPLE 9-6 | 0.5 | 0.5 | 0 | LiPF$_6$: 0.9 CHEMICAL FORMULA 1: 0.1 | 88 |
| EXAMPLE 9-7 | 0.2 | 0.8 | 0 | LiPF$_6$: 0.8 Li(CF$_3$SO$_2$)$_2$N: 01 CHEMICAL FORMULA 2: 0.1 | 91 |

TABLE 12-continued

| | COMPOSITION OF SOLVENT (MASS RATIO) | | | | CAPACITY RETENTION RATIO AFTER |
|---|---|---|---|---|---|
| | EC | FEC | VC | LITHIUM SALT (mol/l) | STORAGE (%) |
| EXAMPLE 9-8 | 0.2 | 0.8 | 0 | $LiPF_6$: 0.9<br>$Li(C_2F_5SO_2)_2N$: 0.05<br>CHEMICAL FORMULA 1: 0.05 | 88 |
| EXAMPLE 9-9 | 0 | 1.0 | 0 | $LiPF_6$: 0.9<br>$Li(CF_3SO_2)_2N$: 0.1 | 86 |
| EXAMPLE 8-1 | Electrolyte: γ-BL + EC + VC + $LiPF_6$ | | | | 67 |

Chemical Formula 1: lithium bis(oxalato) borate
Chemical Formula 2: lithium difluoro[oxalato-O,O'] borate As shown in Table 12, in Examples 9-1 through 9-9 in which 4-fluoro-1,3-dioxolane-2-one was used, a higher capacity retention ratio was obtained, compared to Example 8-1. In other words, it was found out that when a carbonate derivative containing a halogen atom was used in the electrolyte solution, the storage characteristics could be improved.

Although the invention is described referring to the embodiment and the examples, the invention is not limited to them, and is variously modified. For example, in the embodiment and the examples, the case where a polymeric material is used as a holding body is described; however, an inorganic conductor including lithium nitride or lithium phosphate may be used as a holding body, or a mixture including a polymeric material and an inorganic conductor may be used.

Moreover, in the embodiment and the examples, the coin-type secondary battery and the winding laminate type secondary battery is described; however, the invention is also applicable to secondary batteries with a cylindrical shape, a prismatic shape, a button shape, a thin shape, a large shape and a laminate shape in a like manner. Further, the invention is applicable to not only the secondary batteries but also other batteries such as primary batteries.

Obviously many modifications and variations of the present invention are possible in the light of the above teachings. It is therefore to be understood that within the scope of the appended claims the invention may be practiced otherwise than as specifically described.

What is claimed is:

1. A method of charging and discharging a battery, comprising the steps of:
providing the battery comprising (a) an anode, which includes an anode active material comprising silicon and is capable of inserting and extracting lithium, (b) a cathode, which includes a cathode active material comprising lithium and is capable of inserting and extracting lithium, and (c) an electrolyte including a carbonate derivative containing a halogen atom;
charging the battery; and
discharging the battery,
wherein,
the cathode active material and anode active material are present in amounts such that (a) a molar ratio of lithium atoms to silicon atoms in the anode is 3.5 or more and 4.0 or less when the battery is charged and (b) the molar ratio of lithium atoms to silicon atoms is 0.40 or more and 0.46 or less when the battery is discharged.

2. A method of charging and discharging a battery comprising the steps of:
providing the battery comprising (a) an anode, which includes an anode active material comprising silicon is capable of inserting and extracting lithium, (b) a cathode, which includes a cathode active material comprising lithium and is capable of inserting and extracting lithium, and (c) an electrolyte including a carbonate derivative containing a halogen atom;
charging the battery; and
discharging the battery,
wherein,
the cathode active material and the anode active material are present in amounts such that (a) the battery has a reference potential of 0.04 V or more and 0.1 V or less when the battery is charged and (b) the battery has a reference potential of 1.1 V or more and 1.4 V or less when the battery is discharged.

3. A battery comprising:
an anode, the anode including an anode current collector and an anode active material;
a cathode, the cathode including a cathode active material, and
an electrolyte,
wherein,
the anode active material comprises silicon and is capable of inserting and extracting lithium,
the cathode active material comprises lithium and is capable of inserting and extracting lithium,
the electrolyte includes a carbonate derivative containing a halogen atom, and
a ratio between the amount of the cathode active material and the amount of the anode active material is an amount such that (a) a molar ratio of lithium atoms to silicon atoms in the anode is 3.5 or more and 4.0 or less when the battery is charged and (b) the molar ratio of lithium atoms to silicon atoms is 0.40 or more and 0.46 or less when the battery is discharged.

4. The battery according to claim 3, wherein the ratio between the amount of the cathode active material and the amount of the anode active material is an amount such that the molar ratio of lithium atoms to silicon atoms in the anode is from 3.5 to 4.0, inclusive, when the battery is charged.

5. The battery according to claim 3 wherein the molar ratio of lithium atoms to silicon atoms in the anode is from 0.40 to 0.46, inclusive, when the battery is discharged.

6. The battery according to claim 3 wherein the anode current collector is alloyed with at least a part of the anode active material layer.

7. The battery according to claim 3 wherein the anode active material layer is formed on the anode current collector by at least one method selected from the group consisting of a vapor-phase deposition method, a liquid-phase deposition method and a sintering method including silicon.

8. The battery according to claim 1 wherein the electrolyte includes at least one kind of cyclic carbonate having an unsaturated bond.

* * * * *